May 7, 1957 H. M. LYLE 2,791,077
LAWN EDGER
Filed July 17, 1953
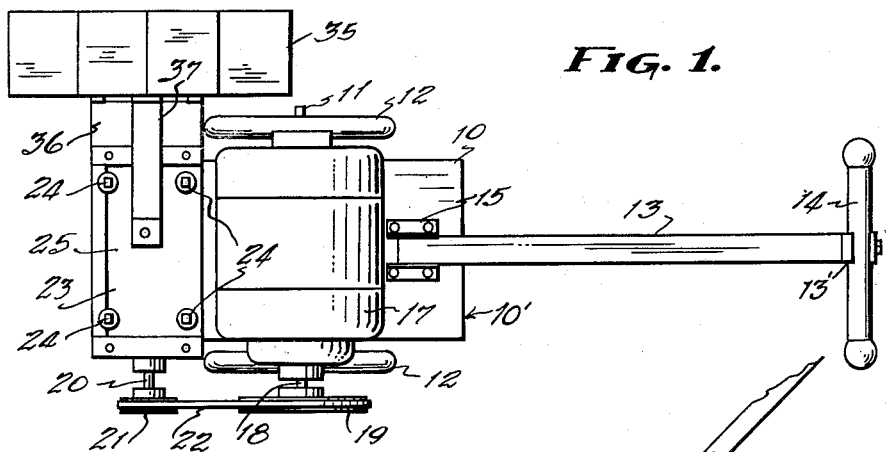
Fig. 1.
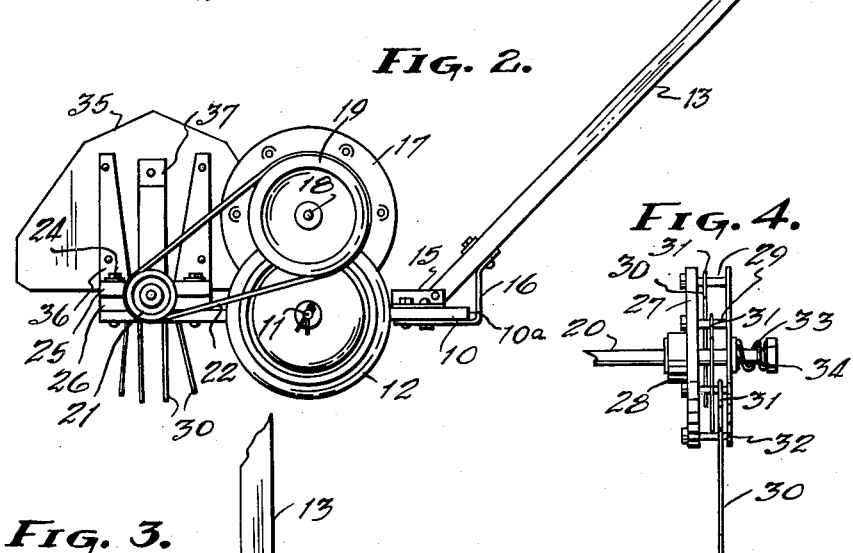
Fig. 2.
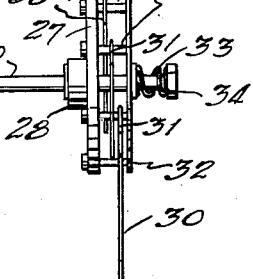
Fig. 4.
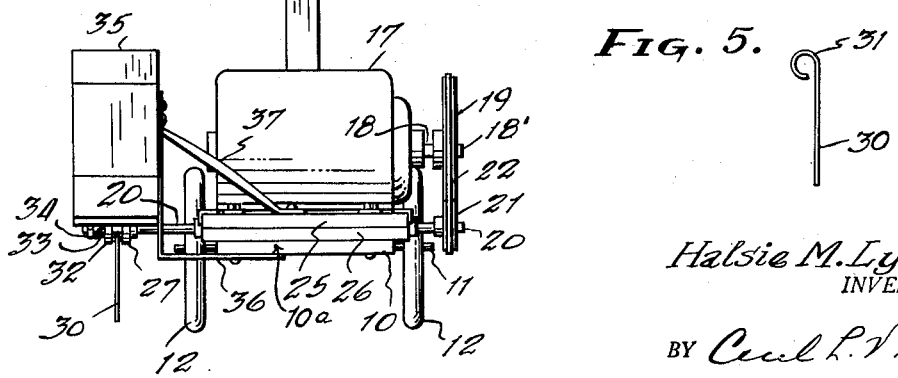
Fig. 3.
Fig. 5.
Halsie M. Lyle
INVENTOR.
BY Cecil L. Wood
ATTORNEY

United States Patent Office 2,791,077
Patented May 7, 1957

2,791,077

LAWN EDGER

Halsie M. Lyle, Fort Worth, Tex.

Application July 17, 1953, Serial No. 368,770

6 Claims. (Cl. 56—25.4)

This invention relates to grass cutting and edging devices, and it has particular reference to a rotary mechanism driven by a motor by which the cutting elements perform their function through centrifugal action, and the principal object of the invention resides in the provision of an effective device by which lawn grasses can be trimmed about walks, curbs, and the like, with a minimum of disturbance of the sod at the juncture thereof with concrete walkways, and other structures, yet insuring a neat and attractive trimming operation.

An object of the invention is that of providing an edging device which is economical in production and maintenance, and affording a mechanism which requires no sharpened cutting members, such as rotary or stationary blades, and thus eliminating any necessity for expensive repairs and replacement of parts which are generally subjected to considerable wear in conventional devices for such use.

It is an object of the invention to provide an edging device in which the purchaser can readily replace the worn cutting elements at little or no expense by forming the same from relatively heavy wire obtainable from various sources even without cost, such as in the use of discarded clothes hangers, and the like.

Broadly, the invention contemplates the provision of a simple and inexpensively maintained mechanism which is capable of performing grass edging operations more effectively and evenly than most conventional devices designed for such purpose which are equipped with various types of blades by which a shearing action is produced.

While the foregoing objects are paramount, other and lesser objects will become manifest as the description proceeds, taken in connection with the appended drawings wherein:

Figure 1 is a plan view of the invention showing the wheeled frame, the motor, and the guard for the rotor.

Figure 2 is a side elevational view of the invention illustrating the centrifugal wire cutting elements depending from the rotor.

Figure 3 is a front elevational view of the mechanism showing the rotor shaft and its bearing, and showing the cutting elements depending from the rotor beneath the guard.

Figure 4 is an enlarged side elevational view of the rotor on its shaft, the latter being fragmentarily shown, and illustrating the series of studs supporting the cutting elements, and the tensioned plate retaining the same, and Figure 5 is an illustration showing one of the cutting elements in detail.

Accordingly, the invention comprises a frame 10 having an axle 11 supporting the same, and a pair of wheels 12 of the axle. A handle member 13 is provided and has a hand grip bar 14 transversely of its upper end 13'. The handle 13 is attached to the rear 10' of the frame 10 by suitable brackets 15 and 16, as shown particularly in Figure 2.

A motor 17 is mounted on the frame 10 so that its shaft 18 is transverse thereto and has a pulley 19 on one end 18'. A shaft 20 is arranged across the forward end 10a of the frame 10 and parallel to the motor shaft 18 and has a pulley 21 on one end aligned with the shaft 18 so that it can be driven by a belt 22 thereby, as apparent in Figures 1 and 2. The shaft 20 is rotatably supported in a bearing 23 secured by bolts 24 to the forward portion 10a of the frame 10.

It is desirable that the bearing 23 be of a simple and inexpensive design, such as the dual arrangement of plates 25 and 26 which are secured together and to the frame 10 by the bolts 24, the inner face of each plate being formed with a groove longitudinally thereof conformably receiving the shaft 20 so that, when the inner faces of the plates are opposingly joined a journal is formed by the grooves for the shaft 20.

On the opposite end of the shaft 20 is a rotor which comprises a circular plate 27 which has an integral hub 28 through which the shaft 20 extends, as shown in Figure 4. Threadedly arranged through the plate 27 is a plurality of studs 29 which are equi-distantly spaced and extend at right-angles from the outer face of the plate 27 near its periphery.

A cutting element 30 of relatively heavy wire is swingably supported on each of the studs 29 in such a manner as to be extended radially from the rotor when the latter is rapidly rotated to produce a "whipping" action capable of severing the grass blades and stems as the machine is moved along a walk or curb.

Each cutting element 30 is formed with a circular loop 31 which is passed over the studs 29 when the disk 32 is forced outwardly on the shaft 20 against the tension of a compression spring 33 which surrounds the shaft 20 and is retained by a nut 34 on the outer end thereof so that a constant tension is exerted upon the disk 32 to urge the same against the outer ends of the studs 29 providing a simple and easily operated retention means for the cutting elements 30.

The centrifugal action of the cutting elements 30, as the machine is moved along the walk, produces a narrow but effective cut close to the walk or curb structure, penetrating to the roots of the grass to deter the same from growing upon the marginal surfaces without inflicting an unsightly trench or groove along the curb or walkway. A clean and attractive demarcation is accomplished between the grass and the bordering structures.

A suitable guard 35 is provided for the rotor and the cutting elements 30, and this member is supported on one side of the frame 10 by a bracket 36 and a suitable bracing member 37. It is desirable that the outer side of the guard member 35 be open in order that the disk 32 can be more readily accessible when it becomes necessary to replace the cutting elements 30.

Manifestly, the structure herein shown and described is capable of certain changes and modifications from time to time, by persons skilled in the art, without departing from the spirit and intent of the invention or the scope of the appended claims.

What is claimed is:

1. In a lawn edging device having a frame, an axle and a pair of wheels and a motor on said frame, a rotor shaft supported transversely of said frame and forwardly of said axle, a rotor on one end of said shaft driven by said motor the said rotor comprising a circular plate having a plurality of spaced studs projecting from its outer face near its periphery, a disk on said shaft bearing against the outer ends of said studs, a cutter element comprising a length of wire swingably arranged on each of said studs capable of radially extending from said rotor when the same is rotated, and a compression spring on said shaft yieldably retaining said disk against said studs and holding said cutter elements thereon.

2. In a cutting device for lawn edging machines having a frame, a motor on said frame, and a shaft driven by said motor and a pair of wheels on said shaft, a rotor element on said shaft comprising a circular plate, a plurality of studs in said plate spaced about the outer face thereof and extending therefrom at right angles, a cutter element, comprising a length of wire, swingably arranged on each of said studs, and a tensioned disk on said shaft bearing against the ends of said studs retaining said wire members thereon.

3. In a centrifugally operated lawn edging device having a frame, a pair of wheels on said frame and a motor driven shaft on said frame, a rotor on said shaft having a plurality of studs spaced about and projecting from its outer face, a cutting element, comprising a length of wire, swingably arranged on each of said studs whereby said cutting elements are extended radially from said rotor in operation, and a disk tensioned on said shaft to bear against the outer ends of said studs to retain said cutting elements thereon.

4. In a lawn edging device having a frame, a pair of wheels and a handle for operating the same from a standing position, and a motor driven shaft on said frame, a rotor on said shaft comprising a circular plate having a plurality of studs spaced about the outer face thereof and projecting at right angles therefrom about said shaft, a cutting element of heavy wire swingably supported on each of said studs capable of centrifugal action when said rotor is rotated, a tensioned disk on said shaft bearing against the ends of said studs and retaining said cutting elements thereon.

5. In a lawn edger having a wheeled frame and a motor driven shaft on said frame, a rotor on said shaft comprising a circular plate having a plurality of studs spaced about its outer face and extending at right-angles therefrom, a cutting element of wire swingably suspended from each of said studs capable of centrifugal cutting action when said rotor is rotated, and a disk on said shaft having a spring bearing thereagainst urging said disk against the outer ends of said studs retaining said cutting elements thereon.

6. In an edging device for lawns having a wheeled frame, a motor on said frame, and a shaft driven by said motor, a rotor on said shaft comprising a circular plate, a series of studs spaced about the periphery of said plate and extending from a face thereof, a cutting element of heavy wire swingably supported on each of said studs and capable of centrifugal cutting action when said rotor is rotated, and a disk on said shaft having a spring bearing thereon urging the same against the ends of said studs to retain said cutting elements thereon.

References Cited in the file of this patent

UNITED STATES PATENTS

| | | |
|---|---|---|
| 285,222 | Brunelle | Sept. 18, 1883 |
| 1,970,827 | Van Kesteren | Aug. 21, 1934 |
| 2,489,383 | May | Nov. 29, 1949 |
| 2,521,033 | Bell | Sept. 5, 1950 |
| 2,538,230 | Boggs | Jan. 16, 1951 |
| 2,569,308 | Haapala | Sept. 25, 1951 |
| 2,618,919 | Hutchens | Nov. 25, 1952 |
| 2,621,463 | Skillman | Dec. 16, 1952 |
| 2,663,137 | Asbury | Dec. 22, 1953 |